Figure 1:
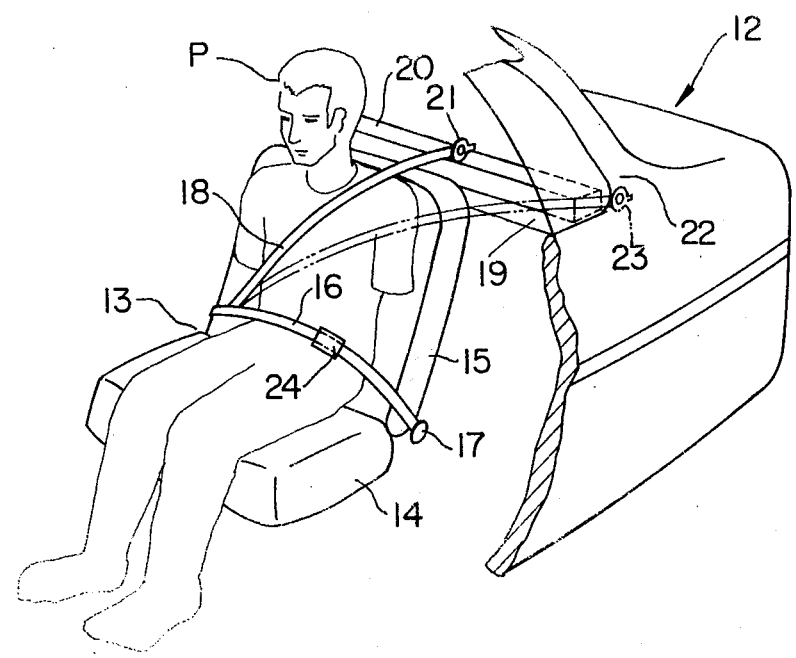

United States Patent [19]
Murakami et al.

[11] 3,909,041
[45] Sept. 30, 1975

[54] REAR SEAT BELT ASSEMBLY

[75] Inventors: Hisakazu Murakami, Yokohama; Heigo Tsuji, Fujisawa; Akira Kaneko, Kamakura, all of Japan

[73] Assignee: Nissan Motor Company Limited, Yokohama, Japan

[22] Filed: Feb. 26, 1974

[21] Appl. No.: 445,953

[30] Foreign Application Priority Data
Feb. 27, 1973 Japan.................................. 48-24961

[52] U.S. Cl............................................ 280/150 SB
[51] Int. Cl.²......................................... B60R 21/10

[58] Field of Search........ 280/150 SB; 297/388, 389

[56] References Cited
UNITED STATES PATENTS
3,584,896  6/1971  Jantzen ......................... 280/150 SB

*Primary Examiner*—Robert R. Song

[57] ABSTRACT

In a lap belt and shoulder belt assembly, one end of the shoulder belt is attached to the lap belt and the other end is attached to a reinforced rear panel behind the body of the seat occupant.

3 Claims, 2 Drawing Figures

REAR SEAT BELT ASSEMBLY

This invention relates to an improved safety seat belt assembly especially suitable for a rear seat of a motor vehicle.

It is well known in the art to provide for a rear seat of a motor vehicle a safety seat belt assembly including a lap belt which extends across the lap of a seat occupant and has one end releasably fixed to a rigid vehicle structure and the other end securely fixed to an anchor or other suitable means mounted on the vehicle body, and a shoulder belt which extends diagonally across the chest of the seat occupant and has lower and upper ends thereof securely fixed, respectively, to an intermediate portion of the lap belt and an anchor or retractor at a position close to a rear pillar of the vehicle body. More particularly, the upper end of the shoulder belt is secured to an anchor or other suitable means at a position outboard of the shoulder of a seat occupant, so that when worn by the occupant, the shoulder belt is often positioned off and below the shoulder of the seat occupant without sufficiently restraining him in the event of sudden deceleration during a collision.

It is therefore an object of the present invention to provide a safety seat belt assembly which overcomes the aforementioned drawback.

It is another object of the present invention to provide a safety seat belt assembly which is particularly suitable for a rear seat of a motor vehicle, and which can restrain a seat occupant in a satisfactory manner when the vehicle experiences a sudden abnormal deceleration as the result of a collision of the vehicle.

It is still another object of the present invention to provide a safety rear seat belt assembly employing a shoulder belt, the upper end of which is secured to a rigid vehicle structure behind a rear seat at a position behind the shoulder of a seat occupant to ensure that the shoulder belt invariably passes over the shoulder of the occupant whenever worn by him diagonally across his chest.

Figure 2:
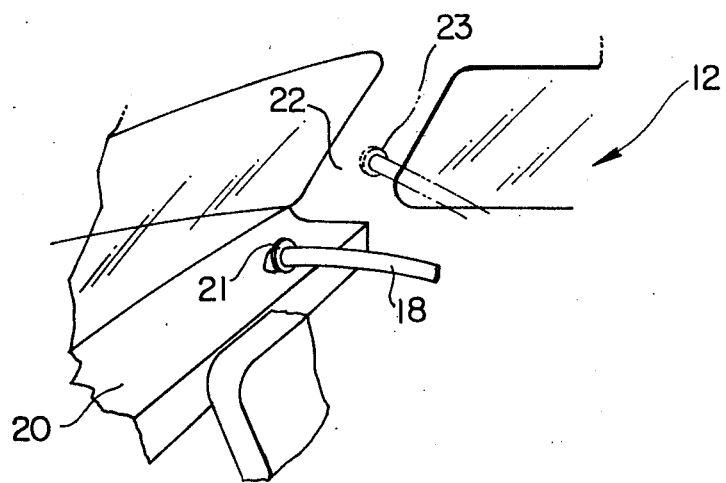

The above and other objects, features and advantages of the present invention will become apparent from the following description and appended claims, taken in conjunction with the accompanying drawings which show by way of example a preferred embodiment of the present invention and in which:

FIG. 1 is a perspective view of a rear portion of a vehicle employing a safety rear seat belt assembly of the invention; and FIG. 2 is a view similar to FIG. 1 but showing a safety rear seat belt assembly of the invention on an enlarged scale and from a different angle.

In the accompanying drawings, the mounting of a conventional rear seat shoulder belt is shown in phantom. Referring to FIGS. 1 and 2, a vehicle 12 of generally conventional construction includes a vehicle body (no numeral) interiorly defining an occupant compartment with a rear seat 13. The rear seat 13 comprises in a usual manner a generally horizontal seat cushion 14 and an upright seat back 15 mounted on a relatively fixed structural portion of the vehicle 12.

A safety seat belt assembly of the invention includes a usual lap belt 16 extending across the lap of a seat occupant P and having one end releasably secured to a rigid floor structure and the other end securely fixed to a rigid floor structure outboard of the rear seat 13 by means of an anchor 17. The safety seat belt assembly of the invention further includes a shoulder belt 18 extending diagonally across the chest of the occupant P for restraining purposes and having a lower end securely fixed to an intermediate portion of the lap belt 16 and an upper end securely fixed to a rigid vehicle structure behind the rear seat 13, preferably to a rear panel or parcel shelf 19 behind the back 15 of the rear seat 13 by means of a reinforcing plate member or elongated rigid member 20 and an anchor 21. In this connection, it is important that the upper end of the shoulder belt 18 be fixed to the panel 19 at a position behind the body of the seat occupant P in order to ensure that the shoulder belt 18 invariably passes over the shoulder of the occupant P. Otherwise the shoulder belt 18 would fail to sufficiently restrain the seated occupant P in the event of a sudden abnormal deceleration during a collision.

As mentioned hereinbefore, it has been the conventional practice to anchor the upper end of the shoulder belt 18 at a position near a rear pillar 22 of the vehicle by use of an anchor 23 as indicated in phantom in FIGS. 1 and 2. This conventional shoulder belt arrangement is disadvantageous in that the belt 18 passes off the shoulder of the seat occupant P and cannot give sufficient restraint to the occupant P during a sudden abnormal deceleration which would cauase him to be thrown violently forward from the seat 13.

In the foregoing description, the upper end of the shoulder belt 18 is illustrated as being fixed to the rear panel 19 by means of the anchor 21. However, it will be appreciated that a suitable belt retractor may be used instead of the anchor 21. Moreover, the lap belt 16 may be divided into two sections which are coupled and uncoupled by suitable releasing means such as a buckle 24.

Regarding the position of fastening the upper end of the shoulder belt 18, viewed rearwardly in the fore and aft direction of the vehicle, the fastening position is behind the body of the seat occupant P in a normal seated position, and is therefore invisible because it is blocked by a portion of the body of the occupant P such as his shoulder or neck.

The foregoing is considered as illustrative only of the principles of the invention. Further, since numerous modifications and changes will readily occur to those skilled in the art, it is not desired to limit the invention to the exact constructions and operation shown and described herein, and accordingly, all suitable modifications and equivalents may be resorted to, falling within the scope of the invention as claimed.

What is claimed is:

1. An improvement to a vehicle body including rear side pillars, at least one rear seat, at least one lap belt having one end secured inboard of said rear seat to a relatively lower portion of said vehicle body and the other end secured outboard of said seat to the other relatively lower portion of said vehicle body, and at least one shoulder belt having one end fixed to said lap belt and the other end fixed to a relatively upper portion of said vehicle body behind said seat; the improvement being in that an elongated rigid member is connected at its both ends with said rear side pillars to form a rigid structure, and in that said the other end of said shoulder belt is connected to said elongated rigid member.

2. An improvement as claimed in claim 1, wherein said the other end of said shoulder belt is connected to said elongated rigid member at a position just behind the back portion of the normally seated occupant.

3. An improvement as claimed in claim 2, wherein said the other end of said shoulder belt is connected to said elongated rigid member by means of detachably engaging means.

* * * * *